United States Patent
Kida et al.

(10) Patent No.: US 8,941,869 B2
(45) Date of Patent: Jan. 27, 2015

(54) IMAGE FORMING APPARATUS, COMMUNICATION DEVICE, AND IMAGE FORMING SYSTEM FOR PRINTING DATA RECEIVED FROM COMMUNICATION TERMINAL DEVICE

(71) Applicant: KYOCERA Document Solutions Inc., Osaka-shi, Osaka (JP)

(72) Inventors: Yasuhiko Kida, Osaka (JP); Yumi Kitamura, Osaka (JP)

(73) Assignee: KYOCERA Document Solutions, Inc., Osaka (JP)

( * ) Notice: Subject to any disclaimer, the term of this patent is extended or adjusted under 35 U.S.C. 154(b) by 71 days.

(21) Appl. No.: 13/720,882

(22) Filed: Dec. 19, 2012

(65) Prior Publication Data

US 2013/0163048 A1 Jun. 27, 2013

(30) Foreign Application Priority Data

Dec. 22, 2011 (JP) ................................ 2011-282203

(51) Int. Cl.
*G06F 3/12* (2006.01)
*H04N 1/00* (2006.01)
*G06K 15/00* (2006.01)

(52) U.S. Cl.
CPC ............ *G06F 3/1296* (2013.01); *G06F 3/1204* (2013.01); *G06F 3/1267* (2013.01);
(Continued)

(58) Field of Classification Search
CPC .................................................... G06F 3/1292
USPC ...................................... 358/1.14, 1.15, 1.16
See application file for complete search history.

(56) References Cited

U.S. PATENT DOCUMENTS 5,918,071 A * 6/1999 Kojo ............................... 710/32
7,034,954 B1 4/2006 Utsunomiya
(Continued)

FOREIGN PATENT DOCUMENTS

JP 06-290006 A 10/1994
JP 2001-080143 A 3/2001
(Continued)

OTHER PUBLICATIONS

Notice of Reasons for Rejection issued to JP Application No. 2011-282203 mailed Jul. 9, 2013.
(Continued)

*Primary Examiner* — Fred Guillermety
(74) *Attorney, Agent, or Firm* — Knobbe Martens Olson & Bear, LLP

(57) ABSTRACT

An image forming apparatus includes a printing data reception unit, an identification information creation unit, an identification information transmission unit, an HDD, an image forming unit, an identification information acceptance unit, and a controller. The printing data reception unit receives from a communication terminal device printing data including printing target data and its printing accompanying information with a predetermined protocol. The identification information creation unit creates identification information upon receiving the printing data. The identification information transmission unit transmits identification information to the communication terminal device. The HDD stores the printing data. The identification information acceptance unit accepts input of the identification information. The controller makes the image forming unit print the printing target data corresponding to the input identification information.

7 Claims, 16 Drawing Sheets

(52) U.S. Cl.
CPC .......... *G06F3/1292* (2013.01); *H04N 1/00307* (2013.01); *H04N 1/0044* (2013.01); *H04N 2201/3207* (2013.01); *H04N 2201/001* (2013.01); *H04N 2201/0013* (2013.01); *H04N 2201/3205* (2013.01)
USPC .......................... 358/1.15; 358/1.14; 358/1.16

(56) References Cited

U.S. PATENT DOCUMENTS

| | | | |
|---|---|---|---|
| 2007/0033444 A1* | 2/2007 | Yun | 714/45 |
| 2008/0209419 A1 | 8/2008 | Maeda | |
| 2011/0149323 A1 | 6/2011 | Kawaura | |
| 2013/0038898 A1* | 2/2013 | Nuggehalli et al. | 358/1.15 |
| 2013/0085968 A1* | 4/2013 | Schultz et al. | 705/400 |

FOREIGN PATENT DOCUMENTS

| | | |
|---|---|---|
| JP | 2003-271347 A | 9/2003 |
| JP | 2005-085105 A | 3/2005 |
| JP | 2008-097239 A | 4/2008 |

OTHER PUBLICATIONS

Office Action issued to U.S. Appl. No. 13/737,877 mailed Nov. 21, 2013.

* cited by examiner

PLEASE PUSH PRINT BUTTON OR DELETE BUTTON.

| IDENTIFICATION INFORMATION | 711826 |
|---|---|
| DOCUMENT NAME | MAP.pdf |
| DETAILED INFORMATION | 2 PAGES, 2 COPIES, COLOR |
| ACCEPTED DATE AND TIME | 2010/10/05 13:35 |
| FEE | 200 YEN |

DELETE    PRINTING d31

FIG. 11
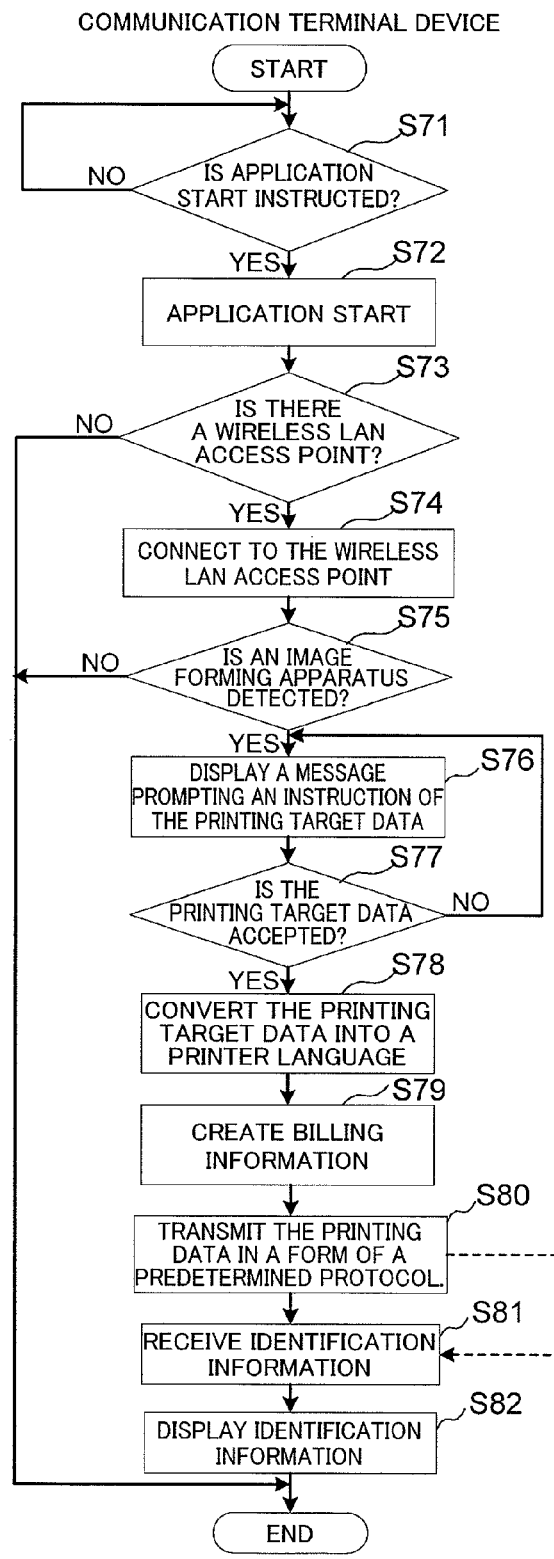
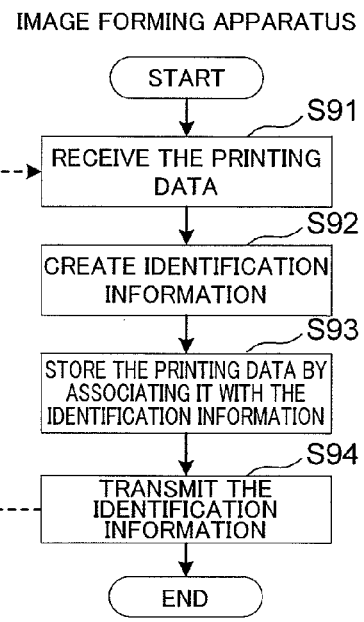

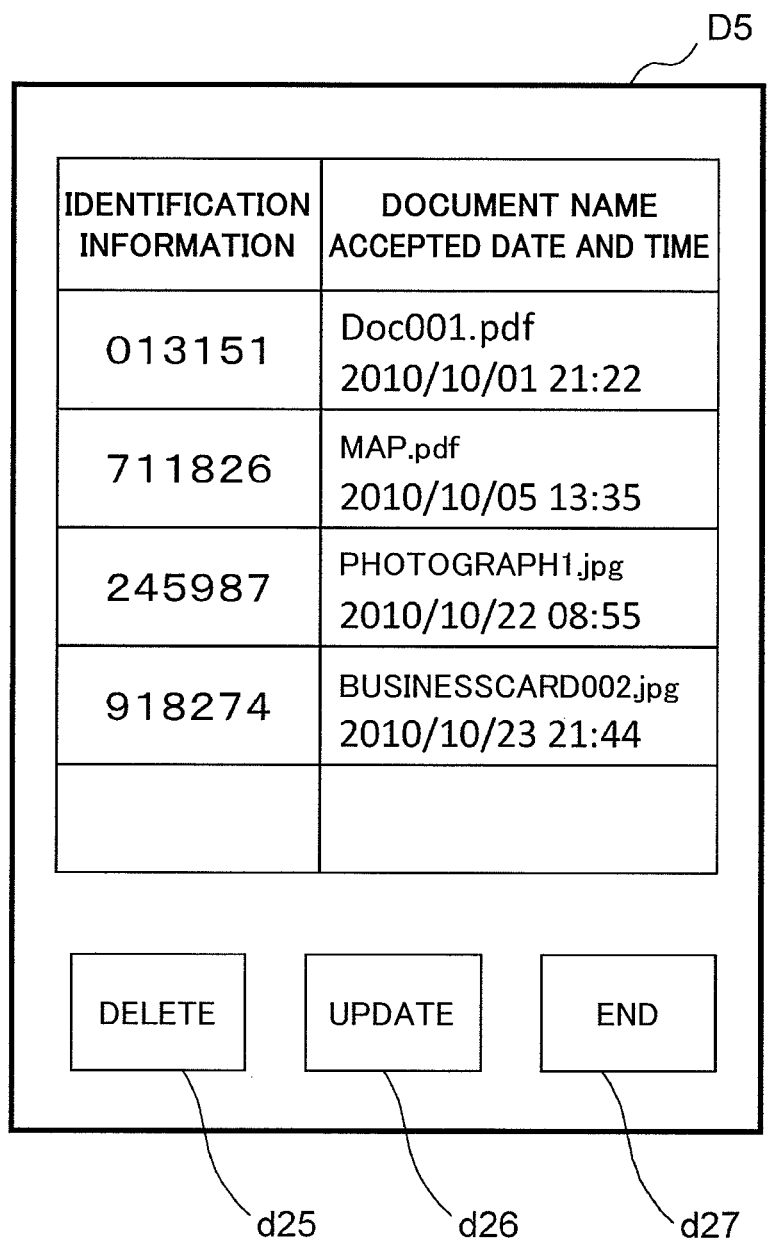

IMAGE FORMING APPARATUS, COMMUNICATION DEVICE, AND IMAGE FORMING SYSTEM FOR PRINTING DATA RECEIVED FROM COMMUNICATION TERMINAL DEVICE

REFERENCE TO RELATED APPLICATIONS

This application is based upon and claims the benefit of priority from the corresponding Japanese Patent Application No. 2011-282203, filed in the Japan Patent Office on Dec. 22, 2011, the entire contents of which are incorporated herein by reference.

BACKGROUND

The present disclosure relates to an image forming apparatus, a communication device, and an image forming system, and in particular, to a technique to print, in the image forming apparatus, printing target data received from a communication terminal device.

Network printing systems have been known heretofore which acquire, via the Internet from an image forming apparatus installed in a remote location, information accumulated in a printing service server on the Internet, enabling printing of the acquired document. A network printing system of such kind is known in which the user registers printing target data in advance by accessing the printing service server from a communication terminal device (e.g., mobile computing device) owned by the user, and then the user inputs a document ID (identification) to an image forming apparatus installed in, for example, a convenience store. This image forming apparatus accesses the printing service server via the Internet and acquires printing target data corresponding to the document ID from the printing service server, and prints the printing target data.

However, in the above-described conventional image forming system, the user needs to register into the printing service server in advance the printing target data that is to be printed in the image forming apparatus. Therefore, the above-described conventional image forming system needs a printing service server and requires the user to perform troublesome preparations for printing. In addition, since the image forming apparatus acquires the printing target data from the printing service server, after the document ID is input from the user, it is difficult to start the printing immediately after the input of the document ID. Nowadays, there is a demand for enabling the user to print the printing target data stored in a communication terminal device, such as a mobile device, of the user with a simpler operation using an image forming apparatus installed in public locations.

SUMMARY

A present disclosure is directed to an image forming apparatus including a printing data reception unit, an identification information creation unit, an identification information transmission unit, a printing data storage unit, a printing unit, an identification information acceptance unit, and a controller.

The printing data reception unit receives printing data including printing target data and its printing accompanying information from a communication terminal device using a predetermined protocol corresponding to the image forming apparatus. The identification information creation unit creates identification information for identifying the printing data when the printing data reception unit receives the printing data. The identification information transmission unit transmits the identification information created by the identification information creation unit to the communication terminal device that has transmitted the printing data. The printing data storage unit stores the printing data received by the printing data reception unit by associating the printing data with the created identification information. The printing unit handles as a printing target the printing target data included in the printing data. The identification information acceptance unit accepts input of the identification information. The controller reads from the printing data storage unit the printing data associated with the identification information the input of which is accepted in the identification information acceptance unit, and makes the printing unit print the printing target data included in the printing data using a part of the printing accompanying information.

BRIEF DESCRIPTION OF DRAWINGS

FIG. 10 is a diagram showing an example of the display screen according to the display unit;

FIG. 11 is a flow chart showing a second embodiment of the printing processing by the image forming system;

FIG. 17 is a diagram showing an example of the display screen of the display unit in the communication terminal device;

DETAILED DESCRIPTION

Figure 1:
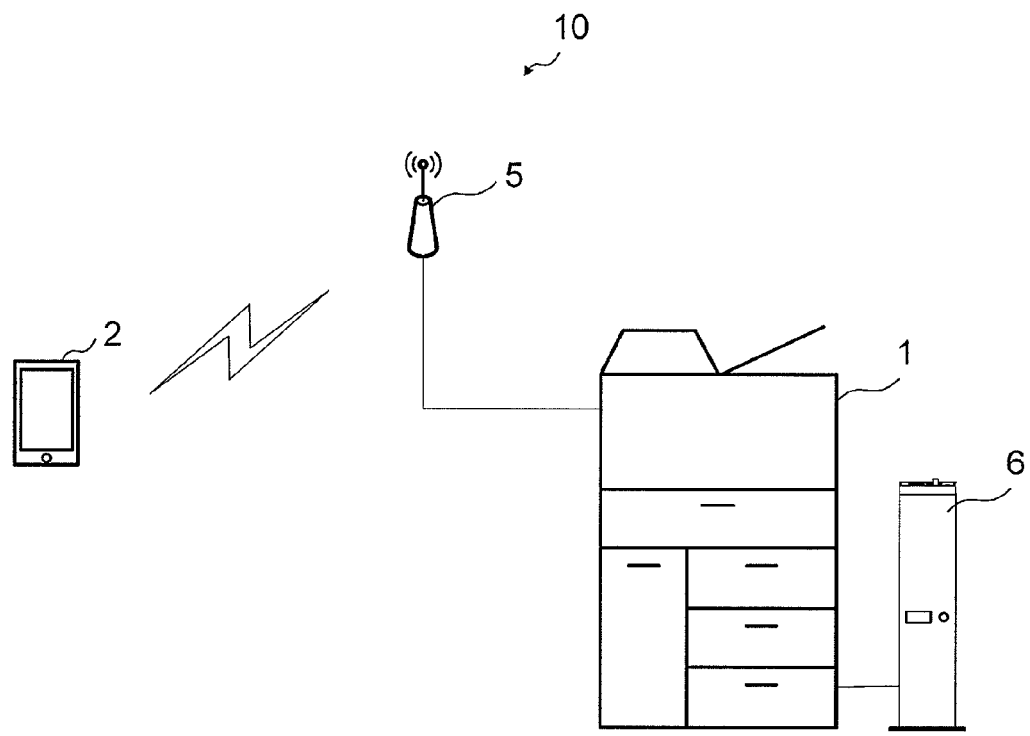
FIG. 1 is an overall structural view of an image forming system according to an embodiment of the present disclosure.

Hereafter, the image forming apparatus, the image formation program, and the image forming system according to an embodiment of the present disclosure will be described with reference to the drawings. FIG. 1 is an overall structural view of the image forming system according to an embodiment of the present disclosure.

The image forming system 10 according to the present disclosure includes a control unit in a communication terminal device 2, and an image forming apparatus 1.

The communication terminal device 2 comprises a mobile device having mobile characteristics, such as a tablet type personal computer, a smart phone, and a mobile phone. The communication terminal device 2 has a communication function that uses, for example, wireless LAN (Local Area Network), and transmits and receives data to and from the image forming apparatus 1 by the communication function via a wireless LAN access point 5, which will be described later. The communication terminal device 2 is owned by a user who visits, for example, a convenience store, where the image forming apparatus 1 is installed.

The image forming apparatus 1, which is an embodiment of the present disclosure, is an apparatus having at least a printer function but the image forming apparatus is not limited to this. The image forming apparatus 1 may be a so-called multi-function device having a plurality of functions, such as printer, copier, and facsimile functions. The present embodiment will be described assuming that the image forming apparatus 1 is a multi-function device. The image forming apparatus 1 has a communication function which uses, for example, wireless LAN, and transmits and receives data to and from the communication terminal devices 2 by the communication function.

For example, the image forming apparatus 1 is installed in a publicly available store such as a convenience store. The image forming apparatus 1 connects to a wireless LAN access point 5 and has a communication function for communicating with the communication terminal device 2 via the wireless LAN access point 5. It should be noted that the image forming apparatus 1 may be connected to the communication terminal device 2 via wire and may have a communication function for communicating with the communication terminal device 2 via a wired connection. Hereinafter, the image forming apparatus 1 will be described by using as an example an arrangement that communicates with the communication terminal devices 2 via the wireless LAN access point 5. That is, the image forming apparatus 1 communicates with the communication terminal device 2 that is inside a communication capable area of the wireless LAN access point 5 via the wireless LAN access point 5 by the communication function. The wireless LAN access point 5 is a radio wave relay device that connects between the terminals by wireless LAN. Access to the wireless LAN access point 5 by the communication terminal device that is inside the communication area can be performed by requesting to the communication terminal device that is inside the communication capable area authorization that uses an ID (identification), which is informed to the user in advance, and a password (e.g., SSID (Service Set Identifier)) and undergoing the authorization.

The image forming apparatus 1 receives the printing target data stored in the communication terminal device 2 from the communication terminal device 2 by network communication via the wireless LAN access point 5 and performs printing (image formation) of the printing target data.

Furthermore, the image forming apparatus 1 is connected to a coin vendor (fee collection unit) 6. The coin vendor 6 is a device that collects from the user coins or paper moneys as a printing fee for the printing target data and detects that the collection is completed (payment completion). The coin vendor 6 has a communication function for performing data communication with a controller 101 (refer to FIG. 2) of the image forming apparatus 1. The coin vendor 6 notifies the image forming apparatus 1 of information of completion or incompletion of the printing fee collection from the user. It should be noted that the coin vendor 6 functions as a part of the image forming apparatus 1 as necessary in the embodiment to be described later.

Figure 2:
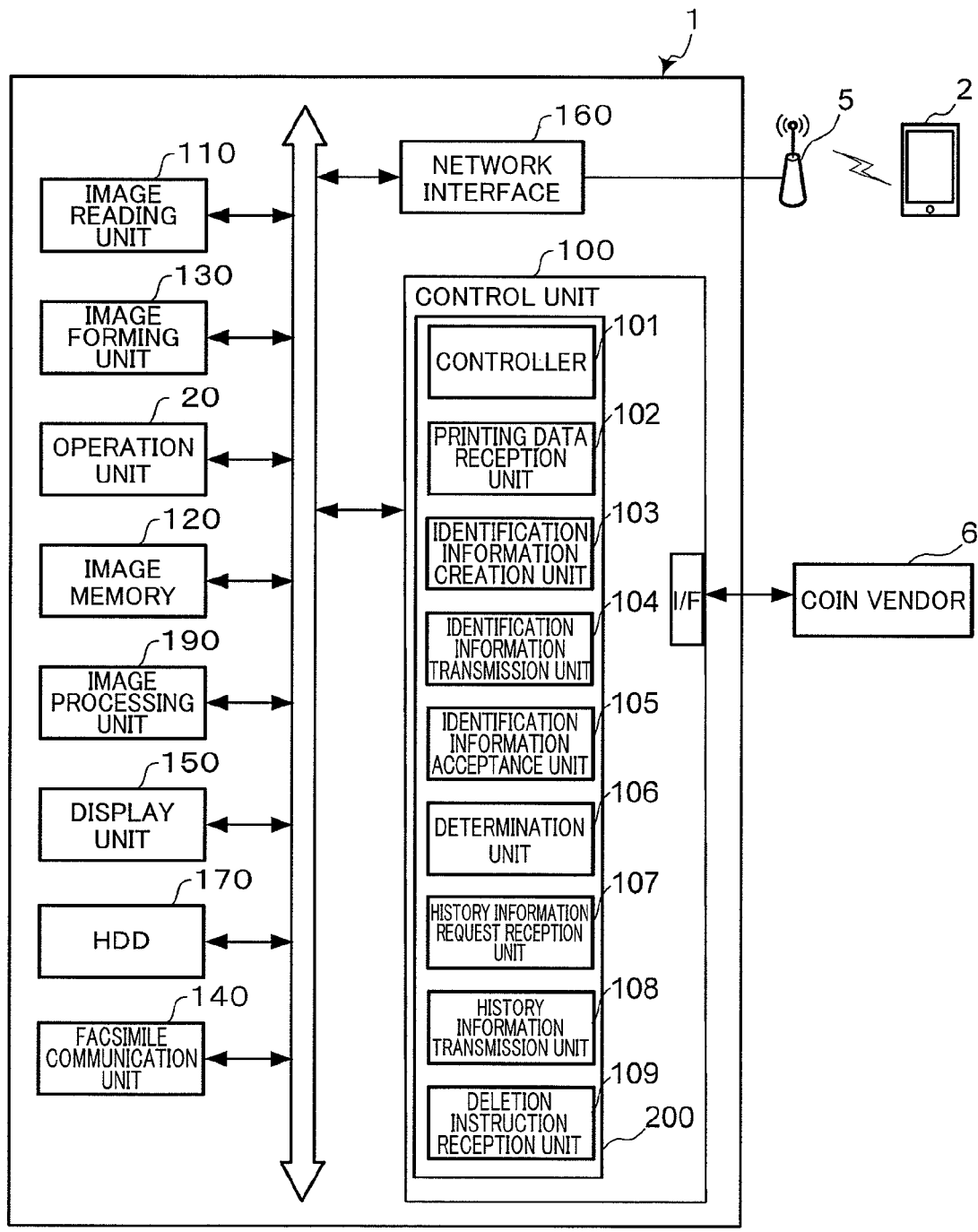
FIG. 2 is a block diagram showing an outline of an internal configuration of the image forming apparatus.

Next, the arrangement of the image forming apparatus 1 will be described. FIG. 2 is a block diagram showing an outline of an internal configuration of the image forming apparatus 1.

The image forming apparatus 1 has a control unit 100, an image reading unit 110, an image memory 120, and an image forming unit 130.

The image reading unit 110 includes, for example, a scanner for reading original images.

The image memory (storage unit) 120 serves as an area that temporarily stores, for example, data of the originals read by the image reading unit 110 and temporarily stores data to be printed by the image forming unit 130.

The image forming unit 130 includes, for example, an electrification device, an exposure device, a developer device, a transfer device, and a fixing device that employ an electro photography technique. The image forming unit 130 forms an image based on, for example, printing target data received by the printing data reception unit 102 from the communication terminal device 2, and original-read data obtained by the image reading unit 110.

In addition, the image forming apparatus 1 includes a facsimile communication unit 140, an operation unit 20, and a display unit 150. The facsimile communication unit 140 performs various functions required for facsimile communication and receives image data from an external facsimile machine via a public line. The operation unit 20 includes, for example, an image formation or transmission start key, numeric and symbol keys, and abbreviated dialing keys, and accepts input of various operation instructions from the user. Examples of the various operation instructions include input of the identification numbers, which will be described later, a printing execution instruction for executing printing of printing data (printing target data) that has been temporarily stored in an HDD 170, which will be described later. The display unit 150 includes an LCD (liquid crystal display), which displays, for example, operation guidance to the user. It should be noted that, the display unit 150 may accept various operation instructions from the user by having a touch panel function.

Furthermore, the image forming apparatus 1 includes the HDD (hard disk drive) 170. The HDD 170 has a large capacity storage area for storing, for example, original image data read by the image reading unit 110. In the present embodiment, the HDD 170 functions as a printing data storage unit. The printing data storage unit temporarily stores the printing data received from the communication terminal device 2 by the printing data reception unit 102 (described later) and suspends the printing target data until there is a printing execution instruction from the user.

The control unit 100 includes a CPU, for example. The control unit 100 includes a controller 101, a printing data reception unit 102, an identification information creation unit 103, an identification information transmission unit 104, an identification information acceptance unit 105, a determination unit 106, a history information transmission instruction reception unit 107, a history information transmission unit 108, and a deletion instruction reception unit 109. It should be noted that an image formation program is stored in the HDD 170 or a ROM, which is not illustrated. By behaving according to the image formation program as a computer, the control unit 100 functions as the controller 101 which serves as an image formation application 200, the printing data reception unit 102, the identification information creation unit 103, the identification information transmission unit 104, the identification information acceptance unit 105, the determination unit 106, the history information transmission instruction reception unit 107, the history information transmission unit 108, and the deletion instruction reception unit 109. It should be noted that the controller 101, the printing data reception unit 102, the identification information creation unit 103, the identification information transmission unit 104, the identification information acceptance unit 105, the determination unit 106, the history information transmission instruction reception unit 107, the history information transmission unit 108 and the deletion instruction reception unit 109 in the control unit 100 may be respectively configured by a hardware circuit instead of behaving based on the image formation program. In addition, the control unit 100 is sufficient if it functions as the determination unit 106, the history information transmission instruction reception unit 107, the history information transmission unit 108, and the deletion instruction reception unit 109 as necessary in the embodiment to be described below.

The printing data reception unit 102 receives printing data from the communication terminal device 2 via the wireless LAN access point 5 and the network interface 160. The printing data reception unit 102 may receive printing data from the communication terminal device 2 via a wired connection and via the network interface 160. However, as described above, the present embodiment will be described using an arrangement that uses wireless LAN connection as an example. The printing data includes the printing target data and its printing accompanying information. The printing target data is data that indicates an entity of an image to be printed, and is generated in a printer language adopted by the image forming apparatus 1 by a printer driver function of the control unit included in the communication terminal device 2. The printing accompanying information is information necessary for identifying a printing scheme of printing target data, such as document name, color/monochrome printing, page size, number of pages, and number of copies. It should be noted that the printing accompanying information includes device information that indicates the communication terminal device 2 that sent the printing data. The printing data that includes the printing target data and its printing accompanying information are transmitted to the image forming apparatus 1 by being formed in a state of a predetermined protocol (HTTPS: Hypertext Transfer Protocol over Secure Socket Layer in the present embodiment) by the control unit included in the communication terminal device 2. The printing data reception unit 102 receives only the printing data generated according to the predetermined protocol.

The identification information creation unit 103 creates identification information for use in identifying the printing data when the printing data reception unit 102 receives the printing data from the communication terminal device 2. The identification information is information added to each piece of printing data for identifying the printing data that has been specified by the user among a plurality of pieces of printing data stored in the HDD 170 that serve as the printing data storage unit. The identification information creation unit 103 creates different identification information for each piece of printing data at random upon receiving the printing data. It should be noted that the controller 101 stores the received printing data in the HDD 170 by associating the printing data with the identification information created for the printing data.

The identification information transmission unit 104 transmits (replies) identification information which is created for the printing data by the identification information creation unit 103 to the communication terminal device 2 that transmitted the printing data.

The identification information acceptance unit 105 accepts input of identification information from the user. The display unit 150 displays a message requesting input of identification information to the user under the control of the controller 101. When the user inputs the identification information by operating the operation unit 20, the identification information is accepted in the identification information acceptance unit 105.

The controller 101 performs operation control for each unit included in the image forming apparatus 1. Furthermore, the controller 101 reads from the HDD 170 the printing data associated with the identification information that has been accepted in the identification information acceptance unit 105, and makes the image forming unit 130 print (image formation) printing target data included in the printing data. The controller 101 is connected to the coin vendor 6 via an interface.

The determination unit 106 determines whether or not a printing fee is required for the user. Based on billing information included in the printing data corresponding to the identification information that has been accepted in the identification information acceptance unit 105, the determination unit 106 determines whether or not the printing fee collection is needed from the user for printing of the printing target data included in the printing data corresponding to the identification information.

It should be noted that the history information transmission instruction reception unit 107, the history information transmission unit 108, and the deletion instruction reception unit 109 will be described later.

Furthermore, the image forming apparatus 1 includes the image processing unit 190 and the network interface 160. The image processing unit 190 performs image data editing/modification processing (encoding/decoding processing, expansion/reducing processing, and compression/extension processing), for example, to the image read by the image reading unit 110. The network interface 160 performs network communication with the communication terminal device 2 via the wireless LAN access point 5.

Figure 3:
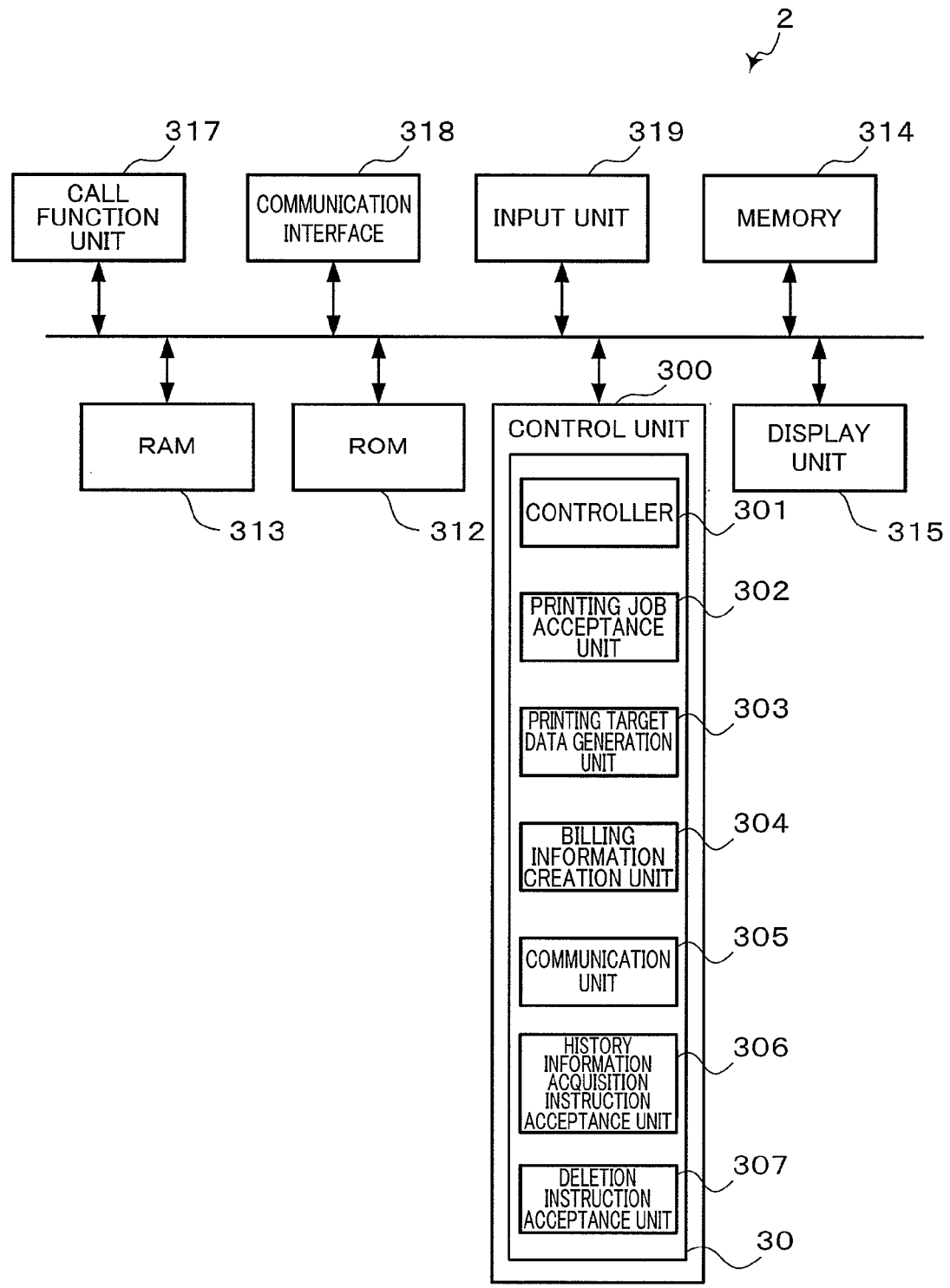
FIG. 3 is a block diagram showing an outline of an internal configuration of the communication terminal device.

Next, the arrangement of the communication terminal device 2 will be described. FIG. 3 is a block diagram showing an outline of an internal configuration of the communication terminal device 2.

The communication terminal device 2 includes a control unit 300, a ROM 312, a RAM 313, a memory 314, a display unit 315, a call function unit 317, a communication interface 318, and an input unit 319. Each of the units is capable of transmitting and receiving data or signals among the units by a CPU bus.

The control unit 300 includes a CPU, for example. The ROM 312 stores operation programs for fundamental operations of the communication terminal device 2. The RAM 313 is used as a work area of the control unit 300, for example.

The memory 314 is a storage medium for storing the printing target data and programs. The memory 314 stores in a part of the storage area various kinds of printing target data which includes document data or image data that is to be printed, for example. It should be noted that a communication program for functioning the control unit 300 as a communication application 30 that enables network communication with the image forming apparatus 1 is stored in the memory 314.

By operating according to the communication program, the control unit 300 functions as the controller 301, the printing job acceptance unit 302, the printing target data generation unit 303, the billing information creation unit 304, the communication unit 305, the history information acquisition instruction acceptance unit 306, and the deletion instruction acceptance unit 307, which serve as the communication application 30.

It should be noted that the controller 301, the printing job acceptance unit 302, the printing target data generation unit 303, the billing information creation unit 304, the communication unit 305, the history information acquisition instruction acceptance unit 306, and the deletion instruction acceptance unit 307 of the control unit 300 may each be configured by a hardware circuit instead of operating based on the communication program. In addition, the control unit 300 is sufficient if it functions as the billing information creation unit 304, the history information acquisition instruction acceptance unit 306, and the deletion instruction acceptance unit 307, as necessary in the embodiment shown below.

The display unit 315 includes an LCD (liquid crystal display), for example. For example, details of various kinds of data, and operation guidance to the user who operates the communication terminal device 2 are displayed in the display unit 315 by the display control of the controller 101.

The call function unit 317 performs a function for making and maintaining telephone calls using the public line. It should be noted that the communication terminal device 2 may have an arrangement that does not include the call function unit 317.

The communication interface 318 functions as an interface for performing data communication with the image forming apparatus 1 via connection to the wireless LAN access point 5 and an interface for performing communication necessary for the call function by the call function unit 317.

The input unit 319 includes keys provided on the housing of the communication terminal device 2, and a touch panel mechanism provided on the display screen portion of the display unit 315, for example. Various operation instructions are input into the input unit 319 from the user.

As described above, the control unit 300 includes the controller 301, the printing job acceptance unit 302, the printing target data generation unit 303, the billing information creation unit 304, the communication unit 305, the history information acquisition instruction acceptance unit 306, and the deletion instruction acceptance unit 307.

The controller 301 performs operation control of the communication terminal device 2 in order to perform processing necessary to print in the image forming apparatus 1 the printing target data stored in the communication terminal device 2.

The printing job acceptance unit 302 accepts input of the printing job that has been input via the input unit 319 from the user. For example, various instructions are input into the input unit 319 by the user as printing jobs. Examples of various instructions include specification of printing target data among, for example, image data and document data stored in the memory 314, data created in an application that can be executed in the communication terminal device 2, and data of an image displayed on a website on the Internet that is being browsed in the communication terminal device 2, and an execution instruction of the printing job. Information about printing accompanying information regarding the printing job (for example, document name, color/monochrome printing, page size, number of pages, and number of copies) is input into the printing job acceptance unit 302 by the user. It should be noted that the kind of the instruction that the input unit 319 accepts from the user is not limited to these.

The printing target data generation unit 303 includes the printer driver function. The printer driver function converts the printing target data into a printer language that corresponds a format of printing by the image forming apparatus 1. The printing target data generation unit 303 converts the printing target data indicated in the printing job that has been accepted in the printing job acceptance unit 302 (that is, the printing target data specified as a printing target in the image forming apparatus 1 by the user) into a printer language adopted in the image forming apparatus 1 (PCL: Printer Control Language (registered trademark) in the present embodiment).

The communication unit 305 connects to the wireless LAN access point 5 via the communication interface 318 and transmits the printing data to the image forming apparatus 1 in accordance with a predetermined protocol (HTTPS in the present embodiment). The printing data includes printing target data converted into the printer language and printing accompanying information regarding the printing target data. It should be noted that the printing accompanying information transmitted by the communication unit 305 includes device information that indicates the communication terminal device 2. The communication unit 305 communicates with the image forming apparatus 1 various kinds of data needed for printing the printing target data.

Based on the printing accompanying information included in the printing job, the billing information creation unit 304 creates billing information indicating the printing fee to be requested to the user who instructs printing of the printing target data. The billing information creation unit 304 creates either one of fee necessary information or fee unnecessary information as the billing information. The fee necessary information indicates that it is necessary to collect a printing fee from the user by the coin vendor 6. The fee unnecessary information indicates that a printing fee is already paid by the user, or the printing fee is not required. The billing information creation unit 304 calculates the printing fee using various kinds of information based on, for example, color/monochrome printing, page size, number of pages, number of copies of the printing accompanying information. The billing information creation unit 304 adds the printing fee information to the billing information in the case of creating the fee necessary information as the billing information. Examples of various kind of information includes a predetermined color printed fee (yen) per page, a monochrome printing fee (yen) per page, and an additional fee (yen) that varies depending on the page size.

It should be noted that the history information acquisition instruction acceptance unit 306 and the deletion instruction acceptance unit 307 will be described later.

Figure 4:
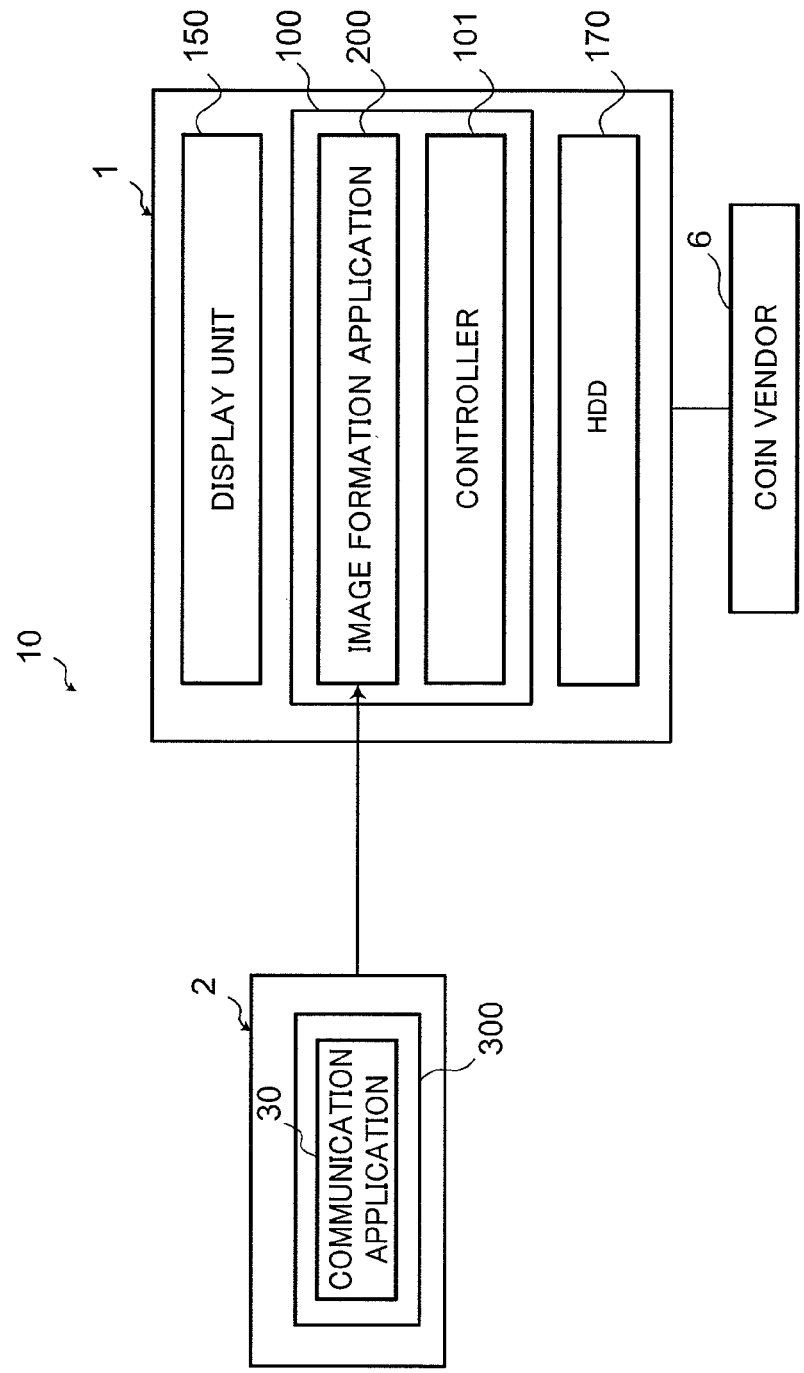
FIG. 4 is a diagram conceptually showing functions for the printing by the image forming apparatus and the communication terminal device.

Next, the processing upon printing the printing target data received from the communication terminal device 2, in the image forming apparatus 1, will be described from a functional viewpoint. FIG. 4 is a diagram conceptually showing functions for the printing by the image forming apparatus 1 and the communication terminal device 2.

In the communication terminal device 2, a communication application 30 starts as a result of an operation of the input unit 319 by the user. The communication application 30 converts the printing target data specified by the instruction from the user into a printer language that corresponds the image forming apparatus 1. The communication application 30 detects a wireless LAN access point capable of performing communication at the location where the communication terminal device 2 is located. Furthermore, the communication application 30 connects to the wireless LAN access point and transmits to the image forming apparatus 1 the printing data including the printing target data that underwent the conversion into the printer language and the printing accompanying information regarding the printing target data in a form according to the predetermined protocol.

In the image forming apparatus 1, the image formation application 200 waits in a state where the printing data according to the predetermined protocol can be received via the wireless LAN access point 5. The above-described predetermined protocol is a protocol different from a protocol adopted in the printing control performed by the control unit 100. By way of the control unit 100 performing separate operations independently from the image formation application 200, the image forming apparatus 1 can make the image forming unit 130 print the printing target data. Thereby, in the image forming apparatus 1, when the printing data according to the predetermined protocol is transmitted from the communication terminal device 2, the image formation application 200 acquires the printing data. The image formation application 200 stores the received printing data in the HDD 170.

Furthermore, the image formation application 200 transmits information such as the above-described identification information to the communication application 30 of the communication terminal device 2.

In addition, the control unit 100 functions as a browser. The browser cooperates with the image formation application 200 to display on the display unit 150 guidance to the user needed for printing the printing data included in the printing data acquired by the image formation application 200.

On a condition that there is input of identification information from the user, the image formation application 200 makes the image forming unit 130 print the printing target data of the printing data corresponding to the identification information by reading the printing target data from the HDD 170.

The image formation application 200 also cooperates with the coin vendor 6, and transmits to the coin vendor 6 an instruction to collect the printing fee and receives notice of completion of the printing fee collection from the coin vendor 6. It should be noted that the cooperation between the image formation application 200 and the coin vendor 6 is a constituting element of the image forming apparatus 1 as necessary in the embodiment shown below.

Figure 5:
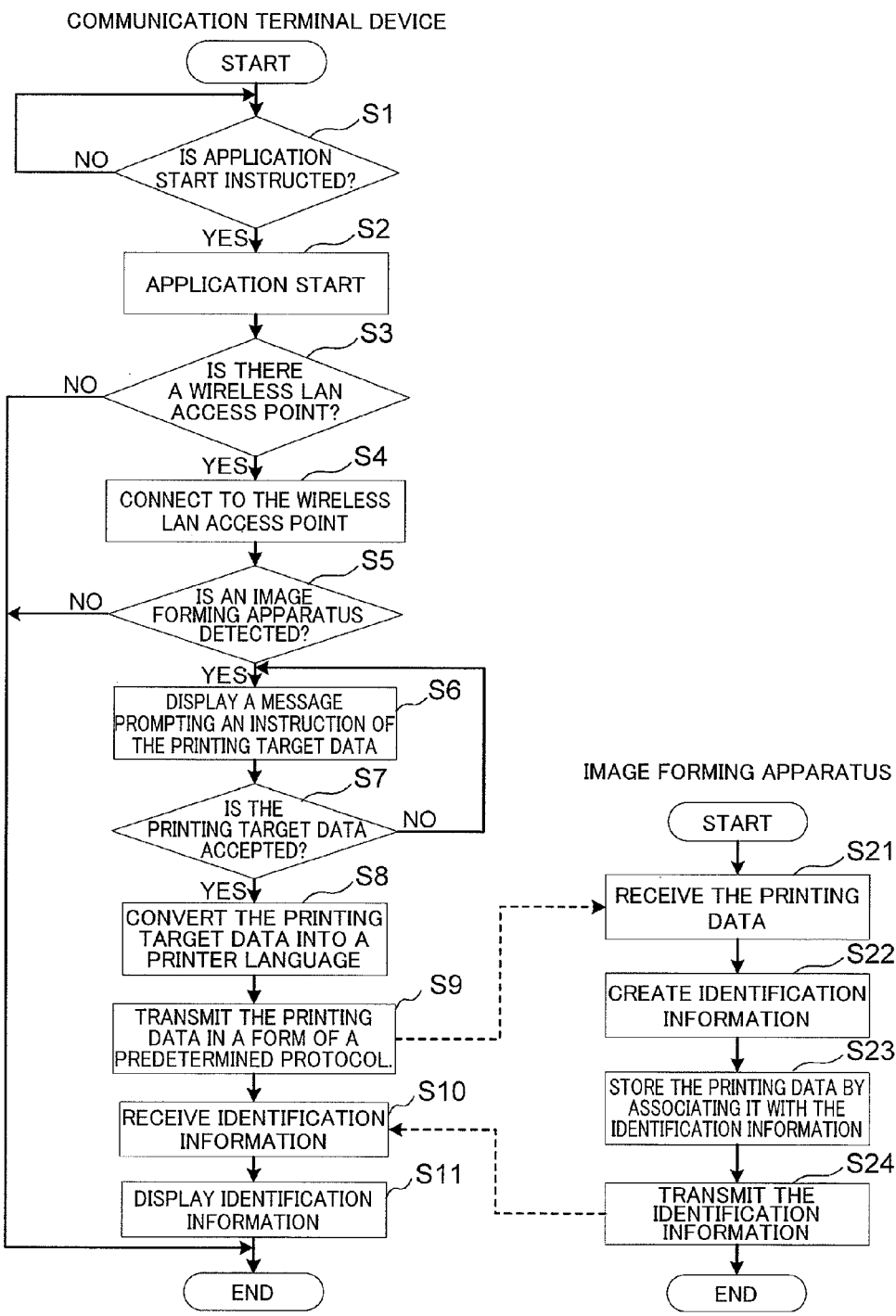
FIG. 5 is a flow chart showing a first embodiment of printing processing by the image forming system.
Figure 6:
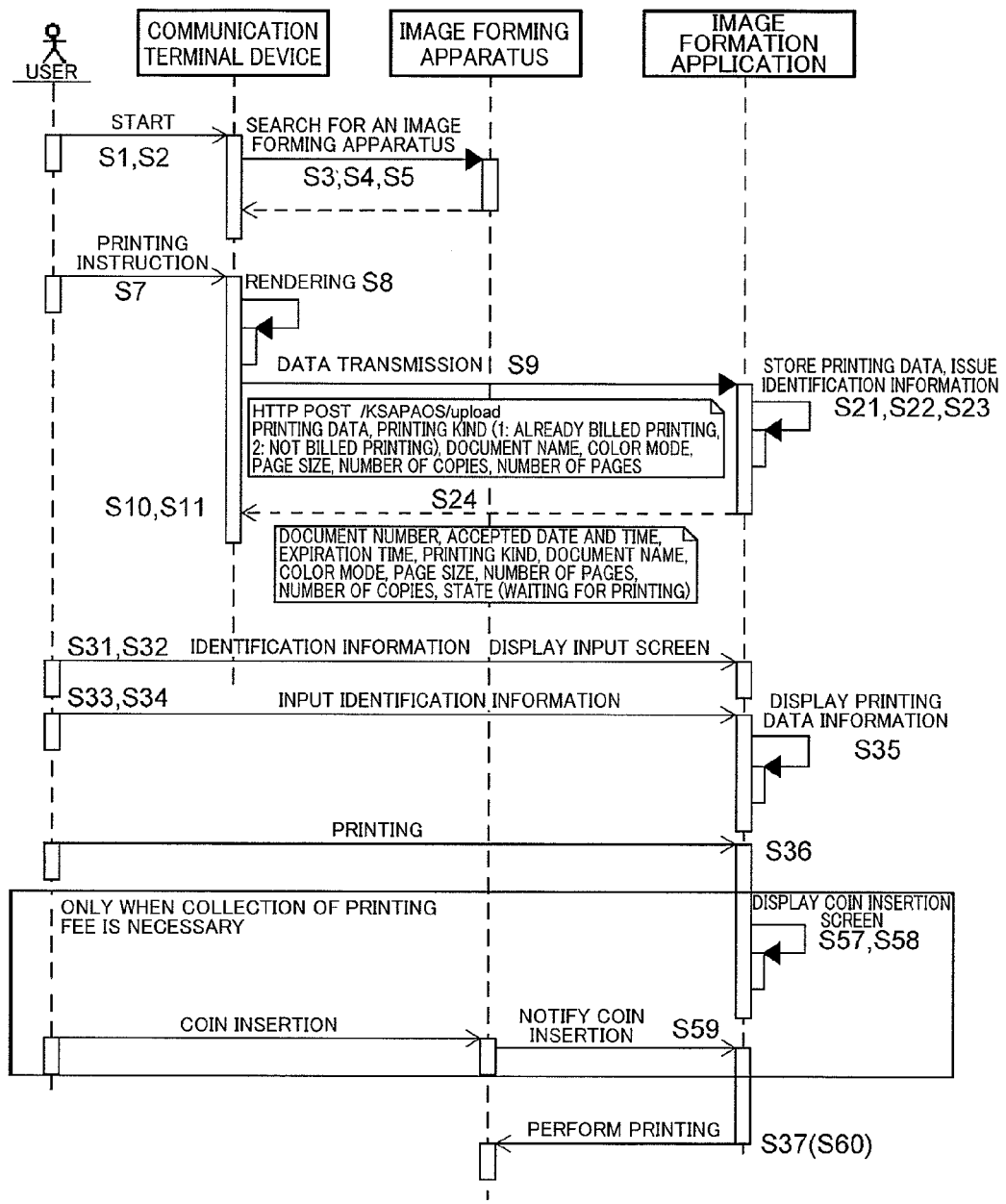
FIG. 6 is a diagram showing an outline of data communication between the communication terminal device and the image forming apparatus.

Next, the first embodiment of the printing processing by the image forming system 10 will be described. FIG. 5 is a flow chart showing the first embodiment of the printing processing by the image forming system 10. FIG. 6 is a diagram showing an outline of data communication between the communication terminal device 2 and the image forming apparatus 1.

When an instruction to start the communication application 30 is input by an operation of the input unit 319 of the communication terminal device 2 by the user and the control unit 100 accepts the instruction to start (YES in S1), the control unit 100 starts the communication application 30 (S2). Thereby, the control unit 100 functions as the controller 301, the printing job acceptance unit 302, the printing target data generation unit 303, the billing information creation unit 304, and the communication unit 305, which serve as the communication application 30.

When the communication application 30 is started, the communication unit 305 executes a wireless LAN accessing function (S3) and searches for a connectable wireless LAN access point via the network interface 160. When a connectable wireless LAN access point is detected (YES in S3), the communication unit 305 connects to the wireless LAN access point (S4). It should be noted that when the communication unit 305 does not detect a wireless LAN access point (NO in S3), the printing processing ends.

Then, the controller 301 searches for the image forming apparatus 1 that is network-connected to the connected wireless LAN access point (S5). By using a predetermined protocol such as SNMP (Simple Network Management Protocol) and Bonjour, the communication terminal device 2 and the image forming apparatus 1 do not need input of IP addresses or setting of a DNS server and can detect with each other automatically.

When the controller 301 does not detect the image forming apparatus 1 (NO in S5), the printing processing ends.

Meanwhile, when the image forming apparatus 1 is detected (YES in S5), the controller 301 makes the display unit 315 display a message prompting input of an instruction to specify the printing target data (S6). Thereafter, when the printing job specifying the printing target data is input by the user by operating the input unit 319 and the printing job is accepted in the printing job acceptance unit 302 (YES in S7), the following processing is performed. Specifically, the printing target data generation unit 303 acquires the printing target data indicated in the accepted printing job (printing target data specified by the user) from, for example, the memory 314 of the communication terminal device 2, and converts the printing target data into a predetermined printer language corresponding the image forming apparatus 1 (PCL in the present embodiment) (S8). It should be noted that the printing target data generation unit 303 waits for conversion of the printing target data into the printer language until the printing job is accepted in the printing job acceptance unit 302 (NO in S7).

Then, the communication unit 305 acquires information of printing accompanying information for the printing target data, such as the number of copies and color/monochrome printing, from the accepted printing job, and adds to the acquired information device information that indicates the communication terminal device 2 to form printing accompanying information. The communication unit 305 transmits the printing data including the printing accompanying information and the printing target data from the communication interface 318 to the image forming apparatus 1 (S9) via the wireless LAN access point 5 in a form of the predetermined protocol (HTTPS in the present embodiment).

In the image forming apparatus 1, when the printing data is transmitted from the communication unit 305 of the communication terminal device 2 in a form of the above-described protocol as described in the above, the printing data reception unit 102 that serves as the image formation application 200 receives the printing data that includes the form of the protocol via the wireless LAN access point 5 and the network interface 160 (S21). When the printing data is received, the identification information creation unit 103 creates the identification information regarding the printing data (S22). The controller 101 stores the printing data in the HDD 170 by associating the printing data with the identification information (S23). Then, the identification information transmission unit 104 transmits the identification number to the communication terminal device 2 that transmitted the printing data via the network interface 160 and the wireless LAN access point 5 (S24). It should be noted that, in the present embodiment, the identification information transmission unit 104 transmits to the communication terminal device 2 the reception date and time, expiration time, state (waiting for printing) of the printing data and the above-described printing accompanying information in addition to the identification information.

In the communication terminal device 2, when the identification information regarding the printing data that has been transmitted to the image forming apparatus 1 in advance is thus transmitted from the image forming apparatus 1, the communication unit 305 receives the identification information (S10). Then, the controller 301 displays the received identification information on the display unit 315 (S11). In the present embodiment, the communication unit 305 also receives the above-described accepted date and time, expiration time, state (waiting for printing) of the printing data, and the above-described printing accompanying information. Therefore, the controller 301 also displays each piece of the received information on the display unit 315 in addition to identification information. As a result of the display of the identification information, the user of the communication terminal device 2 can know, for example, the identification information regarding the printing target data that has been made as the printing target in the image forming apparatus 1 by the user oneself.

Figure 7:
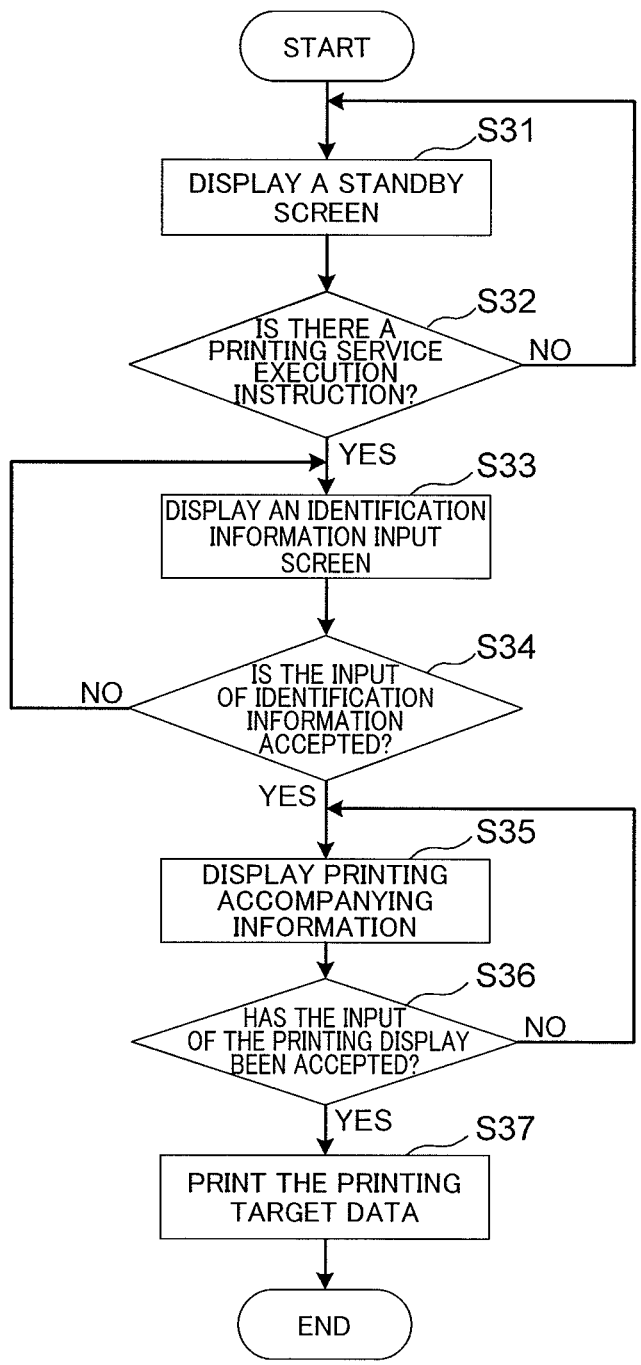
FIG. 7 is a flow chart showing processing of the image forming apparatus after receiving printing data and transmitting identification information.
Figure 8:
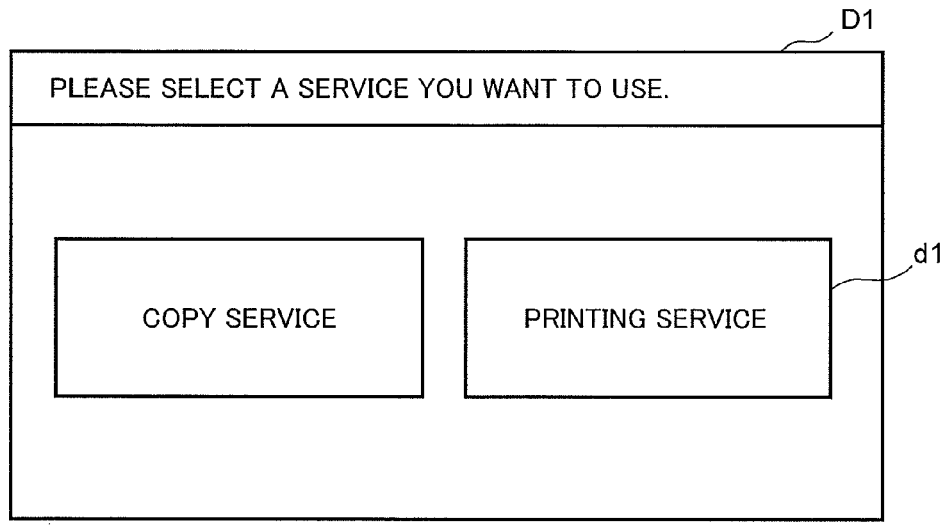
FIG. 8 is a diagram showing an example of a display screen according to a display unit.
Figure 9:
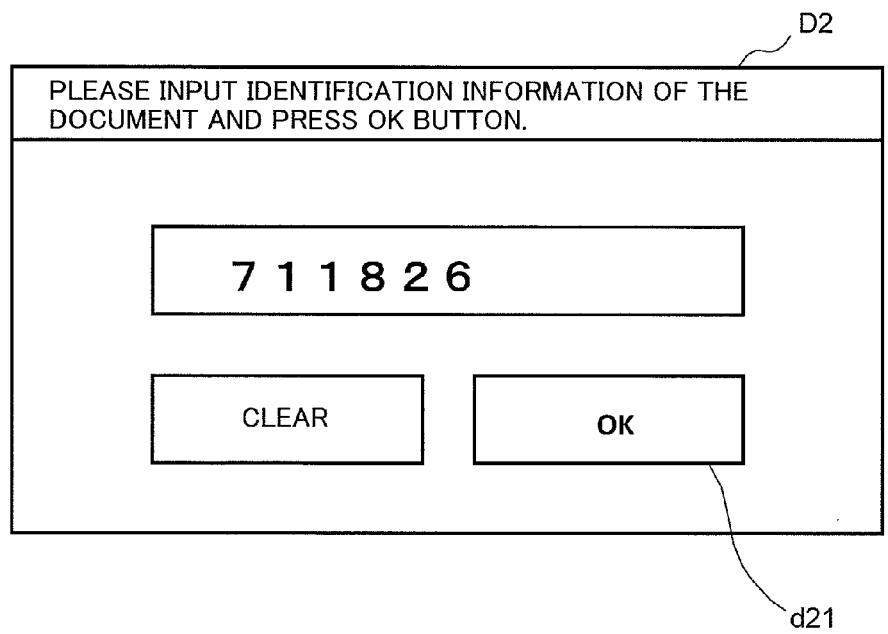
FIG. 9 is a diagram showing an example of the display screen according to the display unit.

Next, processing of the image forming apparatus 1 after receiving the printing data and transmitting identification information will be described. FIG. 7 is a flow chart showing processing of the image forming apparatus 1 after receiving the printing data and transmitting identification information. FIGS. 8 to 10 are diagrams showing examples of the display screens according to the display unit 150.

The image forming apparatus 1 waits for input of the printing execution instruction from the user after the identification information transmission unit 104 has transmitted the identification information regarding the received printing data to the communication terminal device 2. In this waiting state, the controller 101 makes the display unit 150 display a standby screen D1 shown in FIG. 8 (S31).

In this state, for example, when the user performs a touch operation on a "PRINTING SERVICE" display portion d1 in the initial guidance screen D1 and when an instruction to perform the printing service, which is processing for printing the printing target data received from the communication terminal device 2, is input using a touch panel mechanism provided on the display unit 150 as the operation unit 20 based on the touch operation (YES in S32), the following processing is preformed. Specifically, the controller 101 displays on the display unit 150 an identification information input screen D2 (FIG. 9) that shows a message prompting the user to input the identification information (S33). It should be noted that the controller 101 maintains to display the standby screen D1 on the display unit 150 until an instruction to perform the printing service is input (NO in S32; S31).

When the identification information regarding the printing data that has been previously transmitted from the communication terminal device 2 to the image forming apparatus 1 based on an instruction of the user is input by, for example, the operation of the operation unit 20 and a touch operation of an "OK" button d21 in the identification information input screen D2 by the user, and the identification information thus input is accepted in the identification information acceptance unit 105 (YES in S34), the following processing is performed. Specifically, the controller 101 reads from the HDD 170 the printing accompanying information included in the printing data associated with the identification information that has been accepted and the accepted date and time, expiration time, and state (waiting for printing) of the above-described printing data, and displays these on the display unit 150 as a document confirmation screen D3 as shown in FIG. 10 (S35). It should be noted that the controller 101 displays the identification information input screen D2 on the display unit 150 until input of the identification information is accepted in the identification information acceptance unit 105 (NO in S34; S33).

In the state where the document confirmation screen D3 is displayed on the display unit 150, when a printing instruction of the printing target data is input as shown with the display by, for example, a touch operation of the user in "PRINT" button d31 in the document confirmation screen D3 or an operation of the operation unit 20, and when the printing instruction is accepted by the controller 101 (YES in S36), the following processing is performed. Specifically, the controller 101 reads the printing target data (printing target data included in the printing data corresponding to the identification information accepted in S34) from the HDD 170 and forms an image in the image forming unit 130 as indicated in the printing accompanying information of the printing target data (S37), and ends the processing. It should be noted that the controller 101 displays the document confirmation screen D3 on the display unit 150 until accepting input of a printing instruction (NO in S36; S35).

According to the printing processing by the image forming system 10, the image forming apparatus 1, or the communication terminal device 2, the image forming apparatus 1 receives the printing data from the communication terminal device 2 and printing of the printing target data included in the printing data is performed without involving a printing service server on the Internet. Therefore, it is possible to configure a system that prints in the image forming apparatus 1 installed in a public location, such as a convenience store, the printing target data stored in the communication terminal device 2 with a simple arrangement without requiring a printing service server.

In addition, as long as an operation for transmitting printing data from the communication terminal device 2 to the image forming apparatus 1 is performed, the user can print the printing data by transmitting the printing data from the communication terminal device 2 to the image forming apparatus 1, even if the user does not perform a registering work of the printing data into the printing service server in advance, or even if the operation is done after going to, for example, a convenience store, where the image forming apparatus 1 is installed. Therefore, troublesome preparations are not imposed on the user for the printing.

In addition, upon the input of the identification information by the user, the image forming apparatus 1 has already received the printing target data corresponding to the identification information at the time of input. Therefore, it is possible to start the printing immediately after the input of the identification information by the user.

Therefore, in accordance with the present invention, it is possible to enable printing of the printing target data stored in the communication terminal device 2 in the image forming apparatus 1 with a simple system arrangement, and lower the operation burden of the user for the printing. In addition, it is possible to start printing in relatively short time in the image forming apparatus 1 after the printing instruction of the user.

Figure 12:
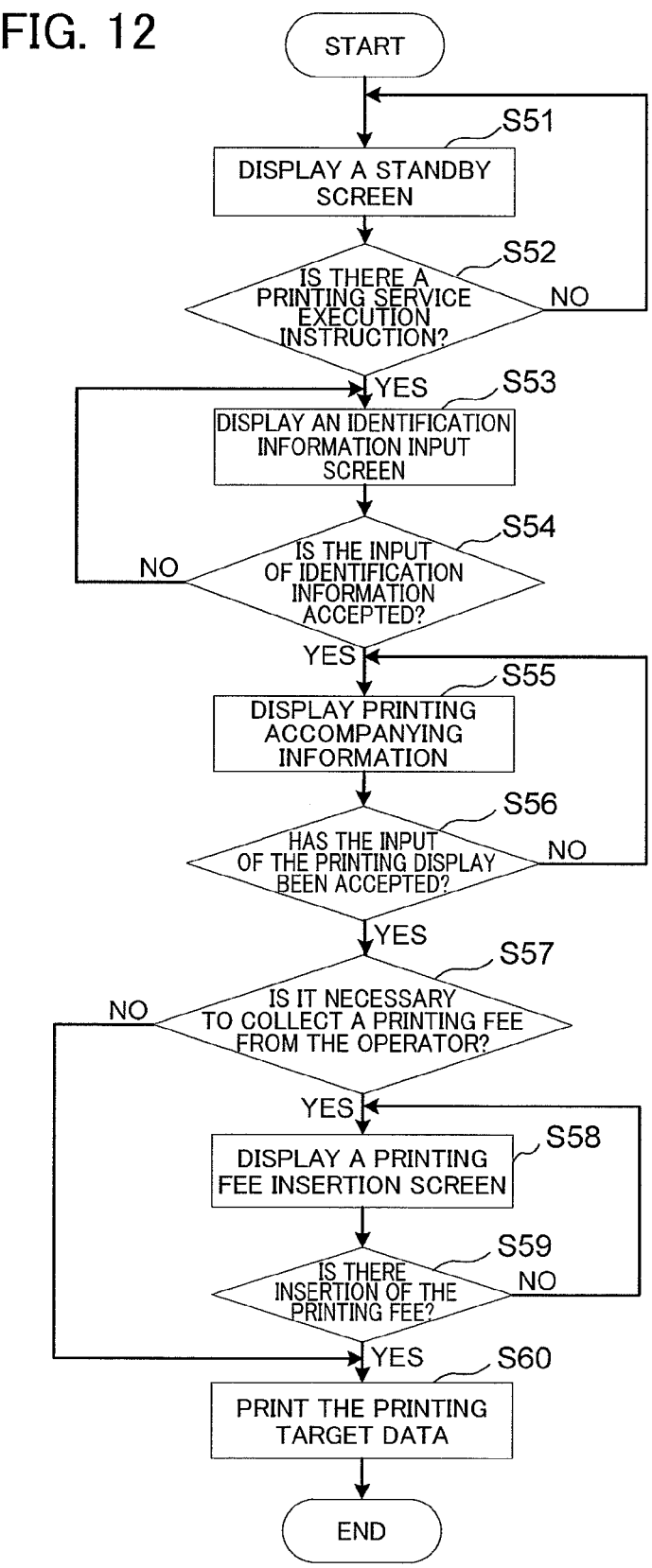
FIG. 12 is a flow chart showing the second embodiment of processing of the image forming apparatus after receiving printing data from the communication terminal device.
Figure 13:
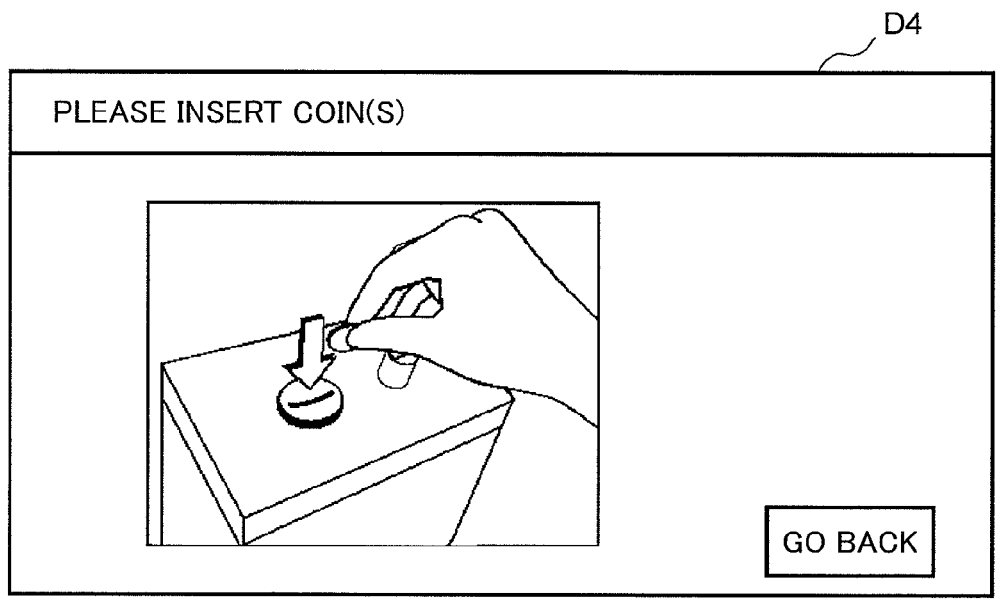
FIG. 13 is a diagram showing an example of the display screen according to the display unit.

Next, a second embodiment of the printing processing by the image forming system 10 and a second embodiment of the processing of the image forming apparatus 1 after receiving the printing data from the communication terminal device 2 and transmitting identification information will be described. FIG. 11 is a flow chart showing the second embodiment of the printing processing by the image forming system 10. FIG. 12 is a flow chart showing the second embodiment of processing of the image forming apparatus 1 after receiving printing data from the communication terminal device 2. FIG. 13 is a diagram showing an example of the display screen according to the display unit 150. Furthermore, each of the second embodiments will be described with reference to the above-described FIG. 3, FIG. 5, and FIG. 8 in addition to FIGS. 11 to 13. It should be noted that the description of similar processing as the first embodiment will be omitted.

In the second embodiment, the communication terminal device 2 includes the billing information creation unit 304 in the control unit 100. In the communication terminal device 2, after the printing target data generation unit 303 had converted the printing target data into a predetermining printer language (S78), the billing information creation unit 304 creates billing information including fee necessary information or fee unnecessary information (S79). For example, when the user has already made the payment of the printing fee of the printing target data to, for example, a provider of the image forming system 10 or the image forming apparatus 1, and when the user inputs into the input unit 319 of the communication terminal device 2 payment completion information including, for example, numbers or symbols provided from the provider on a condition of the payment completion, the billing information creation unit 304 makes the billing information include the fee unnecessary information. Meanwhile, the billing information creation unit 304 makes the billing information include the fee necessary information when the payment completion information is not input by the user.

It should be noted that when creating the fee necessary information as the billing information, the billing information creation unit 304 acquires information regarding the printing accompanying information of the printing target data specified by the user as the printing target at this point in time (page size, number of pages, etc.) from the printing job, and creates the printing fee information indicating the printing fee that is calculated based on the information regarding the printing accompanying information, and adds the printing fee information into the billing information.

In the communication terminal device 2, the communication unit 305 transmits to the image forming apparatus 1 the printing data that includes the billing information in addition to the printing target data and its printing accompanying information further upon transmitting the printing data to the image forming apparatus 1 (S80).

When the printing data reception unit 102 receives the printing data (S91), the image forming apparatus 1 performs processing from S92 to S94 as in the first embodiment and transmits to the communication terminal device 2 that transmitted the printing data the identification information created for the printing data. The image forming apparatus 1 becomes in a state waiting for input of the identification information from the user by the controller 101 displaying the standby screen D1 (FIG. 8) on the display unit 150.

Thereafter, in the image forming apparatus 1, the instruction to perform the printing service and the identification information regarding the printing data desired by the user are accepted (YES in S52 and YES in S54 in FIG. 12) and furthermore, when the controller 101 accepts the printing instruction (YES in S56), the following processing is performed. Specifically, the determination unit 106 determines whether or not collection of the printing fee is needed from the user based on the billing information included in the printing data corresponding to the accepted identification information (S57).

When the determination unit 106 detects fee necessary information from the billing information and determines that the printing fee collection is needed from the user (YES in S57), the controller 101 displays a message prompting to insert the printing fee into the coin vendor 6 by, for example, displaying on the display unit 150 a printing fee insertion screen D4 shown in FIG. 13 (S58).

After this display, the printing fee is inserted into the coin vendor 6 by the user with coins or paper moneys, and when the coin vendor 6 detects the insertion of the coins or the paper moneys corresponding to the printing fee (that is, completion of the printing fee payment) (YES in S59), the following processing is performed. Specifically, the controller 101 is informed of the detection from the coin vendor 6, and the controller 101 reads from the HDD 170 the printing target data of the printing data corresponding to the identification information accepted in S54, and makes the image forming unit 130 print the printing target data (S60). It should be noted that the controller 101 displays the printing fee insertion screen D4 on the display unit 150 until a notification of detecting the completion of the printing fee payment is received from the coin vendor 6 (NO in S59; S58).

Meanwhile, when the determination unit 106 detects the fee unnecessary information from the billing information and determines that collection of the printing fee from the user is not necessary in S57 (NO in S57), the controller 101 reads from the HDD 170 the printing target data of the printing data corresponding to the identification information accepted in S54 and makes the image forming unit 130 print the printing target data without requiring the detection of the completion of the printing fee payment by the coin vendor 6 (S60).

According to the second embodiment, it is possible to control whether to print on a condition of the printing fee collection or to print without the printing fee collection from the user according to the details of the billing to be billed by the provider of the image forming system 10 or the image forming apparatus 1 to the user. Therefore, it is possible to provide to the user printing service according to the billing status of the user.

Next, the printing data deletion processing by the image forming system 10 and the processing of the image forming apparatus 1 in this case will be described. An arrangement necessary for the printing data deletion processing will be described with reference to the above-described FIG. 2 and FIG. 3.

As described above, the communication terminal device 2 includes the history information acquisition instruction acceptance unit 306 and the deletion instruction acceptance unit 307.

The history information acquisition instruction acceptance unit 306 accepts history information acquisition instructions input by the operation of the input unit 319 by the user. The history information acquisition instruction is an instruction to execute an action that requests to the image forming apparatus 1, which is in a state capable of communicating with the communication terminal device 2, the transmission of the history information indicating history of the printing data previously transmitted from the communication terminal device 2 and stored in the HDD 170 of the image forming apparatus 1. In addition, the history information includes a name (document name) of each piece of printing data that has been previously stored in the HDD 170 of the image forming apparatus 1 (those transmitted from the communication terminal device 2) and identification information stored by being associated with each piece of printing data. When the history information acquisition instruction is accepted from the user in the history information acquisition instruction acceptance unit 306, the communication unit 305 requests transmission of history information to the image forming apparatus 1 via the communication interface 308 and the wireless LAN access point 5. In addition, the communication unit 305 receives history information from the image forming apparatus 1.

The deletion instruction acceptance unit 307 accepts the deletion instruction of each piece of printing data indicated in the history information received from the image forming apparatus 1, based on the operation of the input unit 319 by the user. When the deletion instruction that specifies the printing data as deletion target in the deletion instruction acceptance unit 307 is received from the user, the communication unit 305 requests to the image forming apparatus 1 deletion of the specified printing data via the communication interface 308 and the wireless LAN access point 5.

Meanwhile, the image forming apparatus 1 includes the history information transmission instruction reception unit 107, the history information transmission unit 108, and the deletion instruction reception unit 109 as described above.

The history information request reception unit 107 receives from the communication terminal device 2 the transmission request of the history information via the network interface 160 and the wireless LAN access point 5.

When the transmission request of the history information is received in the history information request reception unit 107, the history information transmission unit 108 transmits the history information regarding the communication terminal device 2 that has requested the transmission of the history information via the network interface 160 and the wireless LAN access point 5. For example, the controller 101 stores in the HDD 170 the printing data and its identification information received from each communication terminal device 2. The printing accompanying information included in the printing data also includes device information indicating the communication terminal device 2 that transmitted the printing data. When the transmission request of the history information is received, the history information transmission unit 108 creates the history information regarding the communication terminal device 2 that transmitted the transmission request based on the device information, the printing data, and its identification information, and transmits the created history information to the communication terminal device 2 via the network interface 160 and the wireless LAN access point 5.

The deletion instruction reception unit 109 receives from the communication terminal device 2 the above-described deletion instruction via the network interface 160 and the wireless LAN access point 5. When the deletion instruction is received in the deletion instruction reception unit 109, the controller 101 deletes from the HDD 170 the printing data indicated in the deletion instruction together with the associated identification information.

Figure 14:
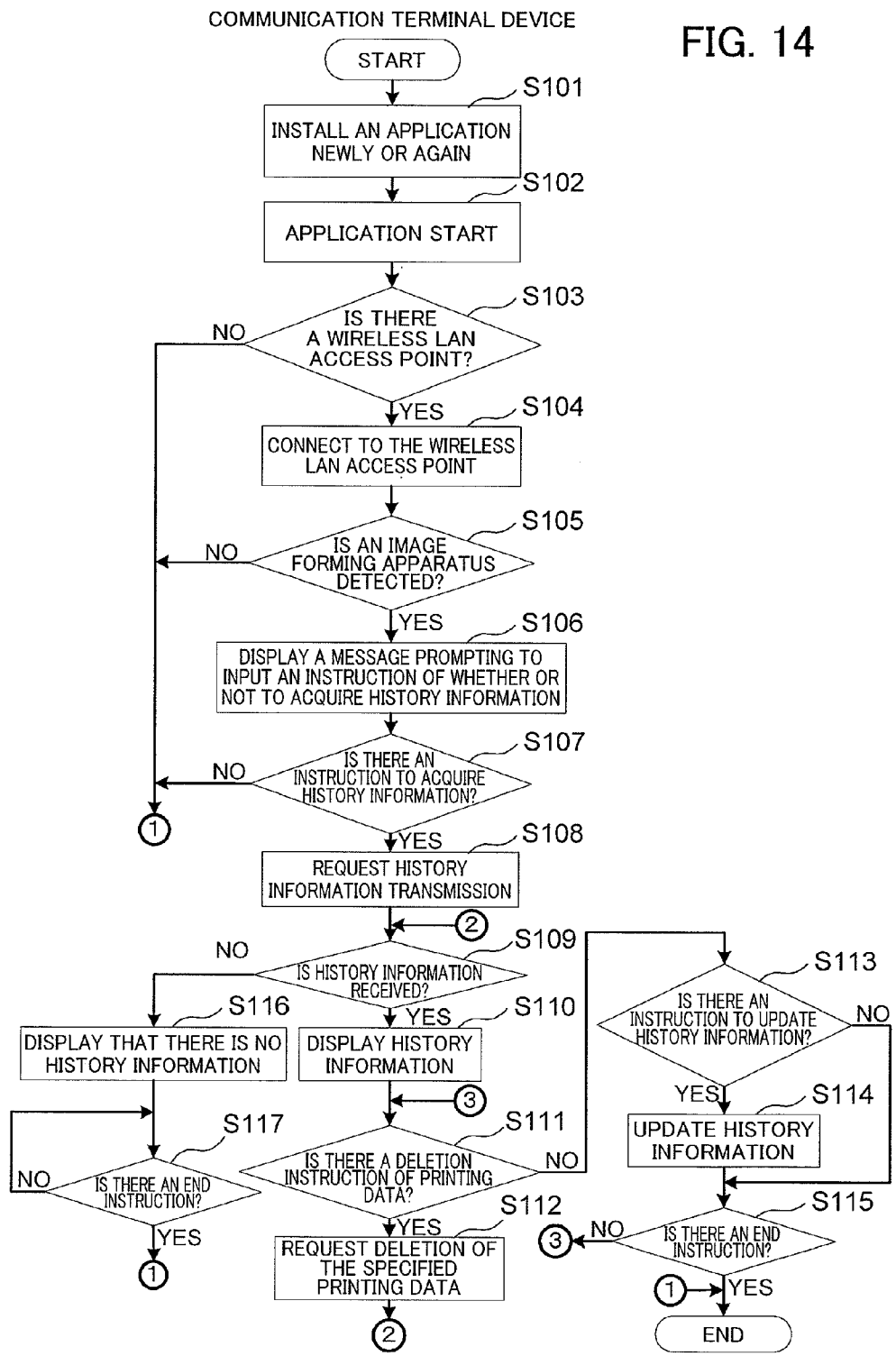
FIG. 14 is a flow chart showing the processing at the side of the communication terminal device upon the printing data deletion processing.
Figure 15:
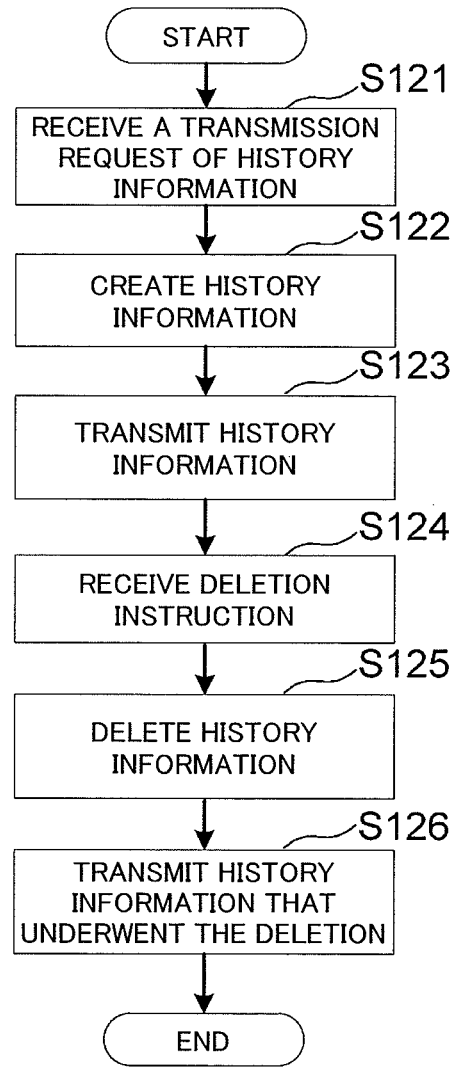
FIG. 15 is a flow chart showing the processing at the side of the image forming apparatus upon the printing data deletion processing.
Figure 16:
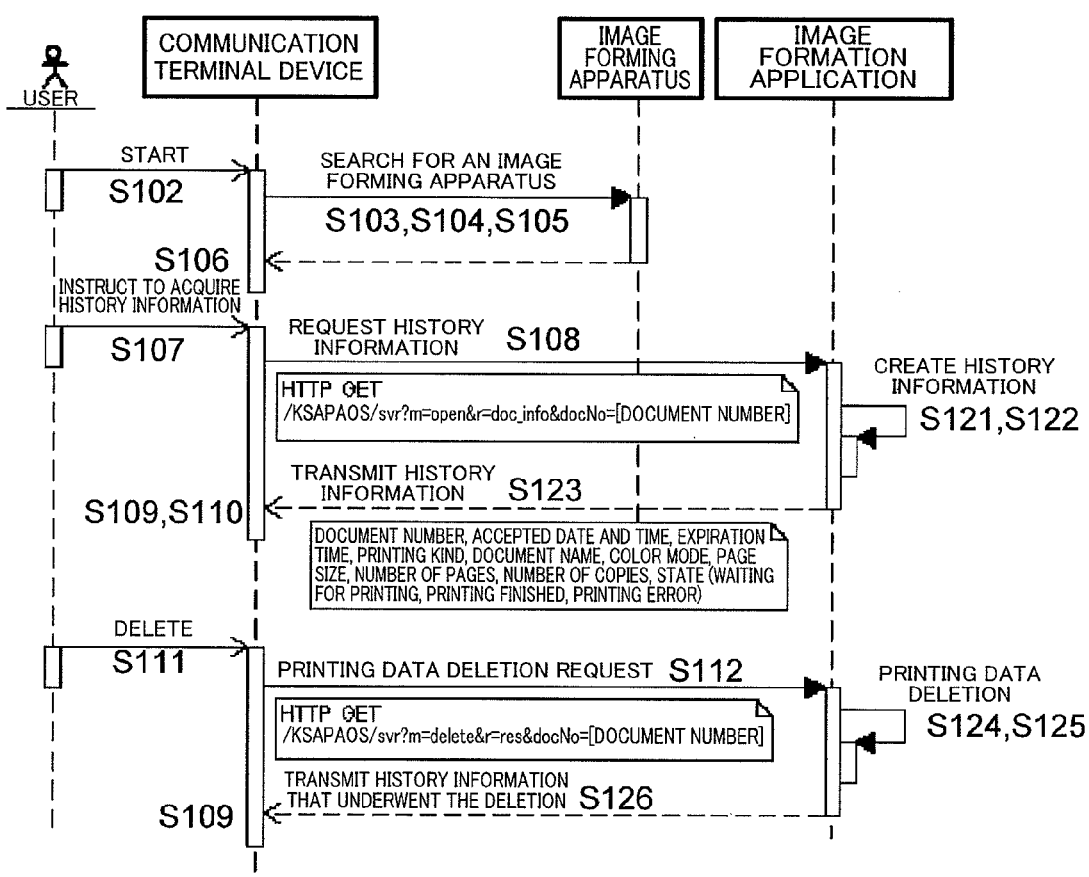
FIG. 16 is a diagram showing an outline of data communication regarding the printing data deletion processing at the communication terminal device and the image forming apparatus.

FIG. 14 is a flow chart showing the processing at the side of the communication terminal device 2 upon the printing data deletion processing. FIG. 15 is a flow chart showing the processing at the side of the image forming apparatus 1 upon the printing data deletion processing. FIG. 16 is a diagram showing an outline of data communication at the communication terminal device 2 and the image forming apparatus 1 regarding the printing data deletion processing. FIG. 17 is a diagram showing an example of the display screen on the display unit 315 in the communication terminal device 2.

In the communication terminal device 2, the printing data deletion processing is performed when the above-described communication program is installed newly or again by the user. In the communication terminal device 2, when the control unit 100 starts the communication application 30 based on a start instruction by the user (S102) when the above-described communication program is installed newly or again by the user (S101), the following processing is performed.

Specifically, the communication unit 305 performs a wireless LAN connecting function via the network interface 160 and searches for a connectable wireless LAN access point (S103). When the connectable wireless LAN access point is detected (YES in S103), the communication unit 305 connects to the wireless LAN access point (S104). It should be noted that when the communication unit 305 does not detect a wireless LAN access point (NO in S103), the processing ends.

Subsequently, as in the case of the above-described printing processing, the controller 301 searches for the image forming apparatus 1 that is network-connected to the connected wireless LAN access point (S105). When the controller 301 does not detect the image forming apparatus 1 (NO in S105), the processing ends.

Meanwhile, when image forming apparatus 1 is detected (YES in S105), the controller 301 makes the display unit 315 display a message prompting input of an instruction indicating whether or not to acquire history information from the image forming apparatus 1 (whether or not to input the history information acquisition instruction) (S106). Thereafter, when the history information acquisition instruction is input by the user by an operation of the input unit 319 and the history information acquisition instruction is accepted in the history information acquisition instruction acceptance unit 306 (YES in S107), the communication unit 305 requests transmission of the history information to the image forming apparatus 1 (S108). The communication unit 305 performs the above request to the image forming apparatus 1 together with the request for the device information (terminal identification information number) for identifying the communication terminal device 2. When the history information acquisition instruction is not accepted in the history information acquisition instruction acceptance unit 306 (NO in S107), the processing ends.

In the image forming apparatus 1, when the transmission request of the history information is transmitted from the communication unit 305 of the communication terminal device 2, the history information request reception unit 107 that serves as the image formation application 200 receives the transmission request of the history information (S121).

When the transmission request of the history information is received in the history information request reception unit 107, the history information transmission unit 108 creates the history information by searching for the printing data of the communication terminal device 2 that has transmitted the transmission request based on the above-described device information, the printing data, and its identification information stored in the HDD 170 (S122). The history information transmission unit 108 transmits the created history information to the communication terminal device 2 (S123).

In the communication terminal device 2, when the communication unit 305 receives the history information from the image forming apparatus 1 (YES in S109), the controller 301 makes the display unit 315 display, for example, name and identification information of the printing data indicated in the received history information by, for example, a history display screen D5 shown as an example in FIG. 17 (S110).

When the deletion instruction that specifies the printing data displayed on the display unit 315 is accepted in the deletion instruction acceptance unit 307 (YES in S111), the communication unit 305 requests deletion of the specified printing data to the image forming apparatus 1 (S112). The above-described deletion instruction is an instruction that specifies the printing data that is to be deleted by using, for example, a touch panel mechanism of the display unit 315 provided as the operation unit 20, when a "DELETE" button d25 in the identification information input screen D5 is touch-operated by the user.

In the image forming apparatus 1, when the deletion instruction reception unit 109 receives the above-described instruction of a deletion request from the communication terminal device 2 (S124), the controller 101 deletes from the HDD 170 the printing data indicated in the deletion instruction together with its associated identification information (S125). Thereafter, the history information transmission unit 108 transmits new history information that underwent the printing data deletion (S126). It should be noted that, in the communication terminal device 2, processing of S109 is performed by using the new history information that underwent the deletion.

Meanwhile, in the communication terminal device 2, when the deletion instruction acceptance unit 307 does not accept a deletion instruction from the user in the processing in S111 (NO in S111) and when the controller 301 accepted an update instruction (YES in S113), the controller 301 updates and stores the history information received in S109 in the storage area such as the memory 314 (S114). It should be noted that the above-described update instruction is an instruction to update and store in the communication terminal device 2 the history information received in S109 with the touch panel mechanism, when an "UPDATE" button d26 in the identification information input screen D5 is touch-operated by the user, for example. Thereby, when the above-described printing processing is performed at the next time in the communication terminal device 2, the controller 301 enables the user to select the printing data indicated in the history information as the printing target. For example, when the image forming apparatus 1 is detected in the printing processing shown in FIG. 5 or FIG. 11 (YES in S5 or S75) and when a message prompting input of the instruction to specify the printing target data on the display unit 315 (S6 or S76), the controller 301 displays the printing data indicated in the above-described history information as a printing target candidate.

When an end instruction for ending the printing data deletion processing is input by using the touch panel mechanism, when an "END" button d27 in the identification information input screen D5 is touch-operated by the user, for example, after processing of S112 or S113, and when the controller 301 accepts an end instruction (YES in S115), the printing data deletion processing ends. It should be noted that when this end instruction is not accepted (NO in S115), the processing returns back to S111.

In addition, when the communication unit 305 does not receive the history information from the image forming apparatus 1 in S109 (NO in S109), the controller 301 makes the display unit 315 display a message indicating that the image forming apparatus 1 does not include history information regarding the communication terminal device 2 (S116).

After this display, the controller 301 makes the display unit 315 display a message indicating that the history information is not included until the end instruction for ending the printing data deletion processing is input based on, for example, an operation in the operation unit 20 by the user (NO in S117). When the display controller 301 accepts the end instruction (YES in S117), the printing data deletion processing ends.

According to this scheme, it is possible to perform processing, such as enabling the selection of the printing data indicated in the history information as the printing target by the user in the communication terminal device 2 and thus it is possible to utilize effectively the printing data related to the communication terminal device 2 that is accumulated in the image forming apparatus 1.

In addition, it is possible to delete the printing data accumulated in the image forming apparatus 1 by the deletion instruction from the side of the communication terminal device 2. Therefore, it is possible to prevent a situation where the printing data owned by the user is kept accumulated in the image forming apparatus 1 over the long period of time with the instruction from the side of the communication terminal device 2.

The summary of the arrangement and the effect of the present disclosure will be described below. In the present disclosure, the image forming apparatus prints the printing data by receiving the printing data from a communication terminal device such as a mobile device without involving a printing service server needed in a conventional technique. Therefore, it is possible to configure a system that prints the printing target data stored in the communication terminal device without needing a printing service server. In addition, by performing an operation to transmit the printing data from the communication terminal device to the image forming apparatus, it is possible to receive and print the printing data in the image forming apparatus without performing a work for registering printing data to the printing service server in advance. Therefore, it is not necessary to request a troublesome preparation work to the user for the printing.

In addition, the image formation program for functioning the computer can be stored (recorded) non-temporarily in a computer readable storage medium, such as an external storage unit and a transportable storage medium, in addition to being stored in a ROM, a hard disk drive, etc., of a computer.

An external storage unit is a memory extension device that includes a storage medium such as a CD-ROM (compact disk-read only memory) and is connected externally to an electronic device. A transportable storage medium indicates, for example, a flexible disk, a memory card, and a magneto-optical disk.

In addition, the program stored in the recordable medium is loaded onto, for example, a RAM of the computer and executed by a CPU (controller). The function of the computer can be achieved by the execution.

It should be noted that the present disclosure is not limited to arrangements of the above-described embodiments and may be modified in various ways. The arrangements and processing shown in the above-described embodiments using FIGS. 1 to 17 are merely of an embodiment of the present disclosure and the present disclosure is not limited to the arrangement or the processing.

The invention claimed is:
1. An image forming apparatus comprising:
a printing data reception unit which receives from a communication terminal device printing data including printing target data and printing accompanying information of the printing target data;
an identification information creation unit which creates identification information for identifying the printing data when the printing data reception unit receives the printing data;
an identification information transmission unit which transmits the identification information created by the identification information creation unit to the communication terminal device that has transmitted the printing data;
a printing data storage unit which stores the printing data received by the printing data reception unit by associating the printing data with the created identification information;
a printing unit which handles as a printing target the printing target data included in the printing data;

an identification information acceptance unit which accepts input of the identification information; and a controller which reads from the printing data storage unit the printing data associated with the identification information the input of which is accepted in the identification information acceptance unit, and makes the printing unit print the printing target data included in the printing data using a part of the printing accompanying information, wherein the communication terminal device is configured to search for a connectable wireless LAN access point so as to communicably connect therewith and to search for the image forming apparatus connected through a network to the wireless LAN access point, when an application software of the communication terminal device starts, wherein the communication terminal device and the image forming apparatus are configured to be automatically detectable mutually with each other by using a predetermined protocol including Simple Network Management Protocol (SNMP) and Bonjour, and wherein the printing data reception unit is configured to receive from the communication terminal device only the printing data generated according to a predetermined protocol including Hypertext Transfer Protocol over Secure Socket Layer (HTTPS).

2. The image forming apparatus according to claim 1, wherein the printing data reception unit receives from the communication terminal device printing data that further includes billing information of the printing target data, and the image forming apparatus further comprises:

a determination unit which determines whether or not printing fee to a user is necessary based on the billing information included in the printing data identified by the identification information the input of which is accepted; and a fee collection unit which collects from the user the printing fee indicated in the billing information, wherein in a case in which it is determined by the determination unit that the printing fee is necessary, the controller makes the printing unit print the printing target data after the printing fee is collected from the user to the fee collection unit, and in a case in which it is determined by the determination unit that the printing fee is unnecessary, the controller makes the printing unit print the printing target data regardless of a condition that the printing fee is collected from the user by the fee collection unit.

3. The image forming apparatus according to claim 1 further comprising:

a historical information request reception unit which receives from the communication terminal device a transmission request of historical information indicating history of the printing data previously transmitted from the communication terminal device and stored in the printing data storage unit; and a historical information transmission unit which transmits the historical information to the communication terminal device that has transmitted the transmission request when the transmission request of the historical information is received by the historical information request reception unit.

4. The image forming apparatus according to claim 2 further comprising:

a historical information request reception unit which receives from the communication terminal device a transmission request of historical information indicating history of the printing data previously transmitted from the communication terminal device and stored in the printing data storage unit; and a historical information transmission unit which transmits the historical information to the communication terminal device that has transmitted the transmission request when the transmission request of the historical information is received by the historical information request reception unit.

5. The image forming apparatus according to claim 1 further comprising:

a deletion instruction reception unit which receives from the communication terminal device that has received a historical information a deletion instruction of the printing data indicated in the historical information, and wherein the controller deletes the printing data indicated in the deletion instruction from the printing data storage unit when the deletion instruction is received in the deletion instruction reception unit.

6. A communication device comprising:

a printing data reception unit which receives from a communication terminal device printing data including printing target data and printing accompanying information of the printing target data;

an identification information creation unit which creates identification information for identifying the printing data when the printing data reception unit receives the printing data;

an identification information transmission unit which transmits the identification information created by the identification information creation unit to the communication terminal device that has transmitted the printing data;

a printing data storage unit which stores the printing data received by the printing data reception unit by associating the printing data with the created identification information;

a printing unit which handles as a printing target the printing target data included in the printing target data;

an identification information acceptance unit which accepts input of identification information; and a controller which reads from the printing data storage unit the printing data associated with the identification information the input of which is accepted in the identification information acceptance unit, and makes the printing unit print the printing target data included in the printing data using a part of the printing accompanying information, wherein the communication terminal device is configured to search for a connectable wireless LAN access point so as to communicably connect therewith and to search for the communication device connected through a network to the wireless LAN access point, when an application software of the communication terminal device starts, wherein the communication terminal device and the communication device are configured to be automatically detectable mutually with each other by using a predetermined protocol including Simple Network Management Protocol (SNMP) and Bonjour, and wherein the printing data reception unit is configured to receive from the communication terminal device only the printing data generated according to a predetermined protocol including Hypertext Transfer Protocol over Secure Socket Layer (HTTPS).

7. An image forming system which includes a control unit provided in a communication terminal device and an image forming apparatus which can communicate with the communication terminal device, wherein the control unit of the communication terminal device comprises:

a printing job acceptance unit which accepts input of a printing job from a user;

a printing target data generation unit which generates printing target data that is a printing target of the printing job in a format suitable for printing in the image forming apparatus; and a communication unit which transmits to the image forming apparatus printing data including the printing target data and printing accompanying information extracted from the printing job, and the image forming apparatus comprises:

a printing data reception unit which receives from the communication terminal device the printing data including the printing target data and the printing accompanying information of the printing target data;

an identification information creation unit which creates identification information for identifying the printing data when the printing data reception unit receives the printing data;

an identification information transmission unit which transmits the identification information created by the identification information creation unit to the communication terminal device that transmitted the printing data;

a printing data storage unit which stores the printing data received by the printing data reception unit by associating the printing data with the created identification information;

a printing unit which handles as a printing target the printing target data included in the printing data;

an identification information acceptance unit which accepts input of the identification information; and a controller which reads from the printing data storage unit the printing data associated with the identification information the input of which is accepted in the identification information acceptance unit, and makes the printing unit print the printing target data included in the printing data using a part of the printing accompanying information, wherein the communication terminal device is configured to search for a connectable wireless LAN access point so as to communicably connect therewith and to search for the image forming apparatus connected through a network to the wireless LAN access point, when an application software of the communication terminal device starts, wherein the communication terminal device and the image forming apparatus are configured to be automatically detectable mutually with each other by using a predetermined protocol including Simple Network Management Protocol (SNMP) and Bonjour, and wherein the printing data reception unit is configured to receive from the communication terminal device only the printing data generated according to a predetermined protocol including Hypertext Transfer Protocol over Secure Socket Layer (HTTPS).

\* \* \* \* \*